United States Patent Office 3,513,229
Patented May 19, 1970

3,513,229
METHOD FOR PRESSING THIN WALLED BORON NITRIDE ARTICLES UTILIZING A LIQUID NITROGEN PRETREATMENT
Joseph J. Asbury, Knoxville, Tenn., assignor to the United States of America as represented by the United States Atomic Energy Commission
No Drawing. Filed Aug. 16, 1968, Ser. No. 753,049
Int. Cl. C04b 35/38
U.S. Cl. 264—28                           4 Claims

ABSTRACT OF THE DISCLOSURE

A method of pressing boron nitride particles containing 0–77% $B_2O_3$ into thin walled configurations wherein the desired pressed density of greater than 1.75 gms./cc. is achieved by immersing the particles in liquid nitrogen, allowing the particles to warm up to about room temperature to evaporate essentially all of the liquid nitrogen, and then isostatically pressing the particles at about room temperature and about 30,000 p.s.i. A higher density of at least 2.00 gms./cc. can be achieved by a further step of hot pressing to 1100–1800° C. at pressures of 3000–5000 p.s.i.

---

The present invention relates generally to boron nitride products of high purity, and more particularly to a method of preparing boron nitride powder for the fabrication of such products in thin-walled configurations. This invention was made in the course or, or under, a contract with the U.S. Atomic Eneregy Commission.

Boron nitride has proven to be a significantly valuable material for use in many electrical and high temperature applications since boron nitride is nontoxic, an excellent electrical insulator, a good heat conductor, and is readily machinable. Powder metallurgy techniques including well known hot- and cold-pressing methods are utilized for fabricating boron nitrile shapes or structures of various conventional configurations such as block, rectangular, solid cylinder, disc, etc. The boron nitride powder used in the fabrication of these structures is of the so-called pressable type which may be virtually pure boron nitride except for less than about 7 weight percent (wt. %) boron oxide ($B_2O_3$) for rendering the powders pressable. Pressing boron nitride powder by previous procedures has resulted in structures possessing densities in the order of about 2. gms./cc. which approach theoretical density (2.20 gms./cc.) of boron nitride. However, in order to assure the integrity of the pressed structures when contacted with air, water, alcohol, and other substances similarly effective in causing the deterioration or disintegration of such structures, it was often found necessary to incorporate additives or binders in the pressed structure. While the use of such additives or binders increased the strength of the structure, they also reduce the purity of the boron nitride so as to substantially detract from desirable properites of boron nitride.

Another problem suffered by the previously practiced techniques of fabricating boron nitride structures or products is due to the difficulty of producing thin-walled shapes, e.g., crucibles, tubing, liners, molds, and the like, which are of sufficient strength, density, and purity to be suitable for the intended purpose and yet of sufficiently close tolerances so as to require minimal or no machining to final dimensions. While one of the advantages of boron nitride is its ready machinability, significant material removal from the pressed structure results in increased costs of the structure since the machine salvage or cuttings have not been found to be repressable to acceptable densities. Further, for some thin-walled products or structures, machining may be difficult or impractical.

It is the aim of the present invention to substantially minimize or obviate the above and other shortcomings by providing a non-chemical method of preparing boron niride powder for fabrication into bodies or structures of thin-walled and other configurations. The boron nitride bodies prepared in accordance with the teachings of the present invention are characterized by consisting essentially of pure boron nitride; by having sufficient integrity to withstand contact by agents heretofore deleterious to boron nitride structures; by possessing a density near theoretical density; and by being fabricated within tolerances closely approximating desired product dimensions so as to significantly reduce or eliminate costly machining losses. To practice the present invention boron nitride powder of either the previously known "pressable" or "non-pressable" type is admixed with liquid nitrogen to form a slurry. The liquid nitrogen is evaporated and the "dry" powder is thereafter isostatically cold-pressed into the desired product configuration.

An object of the present invention is to provide a new and improved method of producing boron nitride structures, particularly thin-walled configurations.

Another object of the present invention is to provide a method of preparing boron nitride powder for fabrication into desired structures by isostatically cold-pressing.

Other and further objects of the invention will be obvious upon an understanding of the illustrative method about to be described, or will be indicated in the appended claims, and various advantages not referred to herein will occur to one skilled in the art upon employment of the invention in practice.

Described generally, the present invention relates to the fabrication of boron nitride structures (particularly thin-walled structures of the type described above) by isostatically cold-pressing boron nitride powder prepared or modified for pressing by a unique method. Boron nitride powder is placed in a liquid nitrogen bath and stirred or otherwise agitated for a duration sufficiently long to thoroughly chill the powder and form a slurry. A duration of about 4 to 5 hours has been found satisfactory for forming the slurry. The slurry is then allowed to warm up for effecting the evaporation of all visible liquid nitrogen so that the agglomerates resulting from the bath have been dissociated. The "dried" powders, when at approximately room temperature, are placed in a suitable mold and then isostatically cold-pressed into a suitable configuration.

The boron nitride powder used to fabricate the structures envisioned by the present invention is commercially available and may include virtually pure boron nitride powder and also some impure powders such as those containing the impurity $B_2O_3$, which is incorporated in the commercially available powders for rendering such powders "pressable." A $B_2O_3$ content corresponding to about 2.6 to about 7 wt. percent has previously been considered necessary for obtaining pressure structures by hot- or cold-pressing techniques. The boron nitride powders with less than about 2.6 wt. percent $B_2O_3$ are considered non-pressable and were heretofore unusable or unsatisfactory for any pressings except for possibly with the addition of a substantial quantity of a binder or other adhesive substance. The particle size of the boron nitride powders is preferably −325 mesh (Tyler), but a portion of the powders can be of larger particle size and still provide satisfactory results.

The formation of the slurry consisting of liquid nitrogen and the boron nitride powder is readily accomplished by immersing a suitable quantity of the pressable and/or non-pressable boron nitride powders into a vessel containing a sufficient quantity of liquid nitrogen to envelop the powders and then stirring the mixture for a suitable period of time such as the 4 to 5 hours mentioned above to form a slurry. Upon completing the formulation of the slurry, the liquidus mixture is subjected to an environment wherein the liquid nitrogen may readily evaporate, e.g., an open container. With the evaporation of the liquid nitrogen, the powder agglomerates will dissociate to define a plurality of discrete powders which appear similar to those utilized in previous operations. These powders, when warmed to about room temperature, are then cold-pressed at about the same temperature into the desired product configuration.

There is a substantial difference between the powders treated in accordance with the teachings of the present invention and the powders as previously used since it has heretofore been highly difficult to obtain high density (about 1.75 to 2 gms./cc.) boron nitride products in thin-walled configurations. This problem of the previously known powders has been attributed to a high degree of "springback" exhibited by boron nitride powder which occurs upon relieving the pressure utilized during the pressing operation. In other words, the pressed part tends to expand and decrease in density upon relieving the stress employed in the hot- or cold-pressing procedure. The boron nitride powders treated or modified in the liquid nitrogen bath do not suffer this so-called springback effect since no expansion or decrease in density is apparent in the powders after the pressure utilized during the fabrication is relieved.

While it is not entirely clear why the liquid nitrogen bath facilitates the formation of high density structures from both pressable and non-pressable boron nitride, it is theorized that the treatment in the liquid nitrogen bath modifies the powder by promoting occlusion of gaseous nitrogen on the surface of the particles which results in increased pressability of the boron nitride. Another posibility may be that upon the removal of the boron nitride powder from the liquid nitrogen bath the cold powder condenses a significant quantity of water vapor which acts as a binder during the pressing operation. Neither of these postulations has been substantiated.

In order to fabricate structures utilizing the uniquely treated boron nitride powder, the powder, after warming to approximately room temperature, is introduced into a mold of a suitable configuration and then subjected to a pressure of approximately 30,000 p.s.i., at room temperature. This stress upon the liquid nitrogen treated powder is sufficient to effect the fabrication or formation of a thin-walled structure of essentially pure boron nitride with a wall thickness of about 50 mils or less, if desired, and of essentially pure boron nitride of a density greater than about 1.75 gms./cc. The density of the structure can be even further increased to a density of about 2.0 gms./cc., or better by hot-pressing the cold-pressed structure at a temperature in a range of about 1100° to 1800° C., under the influence of pressures in a range of about 3000 to 5000 p.s.i.

It has been found that the time interval between the liquid nitrogen treatment and the pressing operation is somewhat critical to the density of the final product in that the treated or modified powder loses some of its increased pressability obtained by the liquid nitrogen treatment as time increases. This same effect usually occurs by heating the powder. Consequenty, it is preferable that the isostatic pressing of the powders be accomplished at approximately the powder temperature, that is, about room temperature, and as soon as possible, preferably within about one hour, after the evaporation of the liquid nitrogen is completed while the powders are still in their modified state.

In order to provide a better understanding of the present invention an example of a typical pressing operation is described below. This example is merely illustrative and should not be construed as limiting the scope of the invention, which is limited only by the scope of the appended claims.

EXAMPLE

A quantity of commercially available boron nitride powders of −325 mesh and containing about 2.6 wt. percent $B_2O_3$ is placed in a bath of liquid nitrogen and stirred for about three hours to form a slurry. This slurry is then dried to effect the evaporation of the liquid nitrogen and the dissociation of the powder agglomerates caused by the slurry. When the powders are warmed to about room temperature they are placed in a cylindrically shaped mold formed of an inner aluminum tubulation and an outer wall of a suitable plastic material such as epoxy. The mold, loaded with the treated boron nitride powder, is placed in a large, commercially available isostatic oil press capable of subjecting the confined powders to a stress corresponding to 30,000 p.s.i. The pressing operation is then carried out at room temperature within approximately one-half hour after the warming of the powders to room temperature. Upon release of the stress applied against the powder by the mold walls, the boron nitride powders remain in the pressed shape provided by the mold and the resulting structure is of sufficient integrity to withstand the heretofore considered deleterious attacks by water, air, alcohol, etc.

It will be seen that the present invention provides a unique method for fabricating thin-walled boron nitride structures or components which may find ready employment in many electrical and high temperature applications. Further, the density of the thin-walled structures achieved by practicing the present invention remains at approximately the density achieved for the massive pressings obtained by practicing previously known procedures. The following table is illustrative of the effects of the liquid nitrogen treatment upon the density of boron nitride products or pressings.

TABLE—EFFECTS OF LIQUID NITROGEN TREATMENT ON THE DENSITY OF 2.6 WT. PERCENT $B_2O_3$ BORON NITRIDE PRESSINGS

| Powder used | Density (gms./cc.) | |
| --- | --- | --- |
| | Treated | Untreated |
| Stock, 4 min. press | 1.91 | 1.85 |
| Stock, 24 min. press | 1.97 | 1.91 |
| Prepressed, thin-wall | 1.86 | 1.78 |
| Screened, 4 min. press | [1] 1.83 | 1.85 |
| Screened, thin-wall | 1.78 | 1.71 |

[1] Long period of time (about 2 hours) between treatment and pressing. Boron nitride powder was screened to provide a more uniform size distribution.

Additionally, the present invention relates to a somewhat mechanical method which allows for the production of high density, pure boron nitride structures by cold-isostatic-pressing techniques rather than the somewhat complicated chemical processes and hot-isostatic-pressing methods previously utilized.

As various changes may be made in the form and type of the boron nitride powders, the method of treating the powders, and the pressing steps herein without departing from the spirit and scope of the invention and without sacrificing any of its advantages, it is to be understood that all matter herein is to be interpreted as illustrative and not in a limiting sense.

What is claimed is:
1. The method of fabricating a boron nitride structure of a predetermined thin walled configuration by pressing boron nitride powder, comprising the steps of immersing powder consisting essentially of boron nitride particles with at least a majority of the particles in a size range less than 325 mesh in a bath consisting of a sufficient quantity of liquid nitrogen to envelop the particles, adequately agitating the liquid nitrogen and the particles to form a liquidus mixture thereof, evaporating essentially all of the liquid nitrogen, and thereafter isostatically pressing the particles into the predetermined configuration at a temperature of about room temperature and a pressure up to about 30,000 p.s.i., said pressing step being effected during a time when the particles have warmed to about room temperature and when the pressing provides a structure of a density greater than about 1.75 gms./cc.

2. The method of fabricating a boron nitride structure as claimed in claim 1, including the additional step of hot-pressing the boron nitride structure subsequent to the pressing at about room temperature for providing the structure with a density of at least 2.00 gms./cc., said hot-pressing being at a temperature in a range of about 1100°–1800° C. and a pressure in a range of about 3000 to 5000 p.s.i.

3. The method of fabricating a boron nitride structure as claimed in claim 1, wherein the boron nitride particles includudes $B_2O_3$ in a range of about 0 to 7 weight percent.

4. The method of fabricating a boron nitride structure as claimed in claim 3, wherein the predetermined configuration is a thin-walled configuration having a wall thickness less than about 50 mils.

References Cited

UNITED STATES PATENTS

| | | | |
|---|---|---|---|
| 2,307,371 | 1/1943 | Hileman | 264—28 |
| 3,222,435 | 12/1965 | Mellen | 264—28 |
| 3,312,764 | 4/1967 | Trimble | 264—28 |

JULIUS FROME, Primary Examiner

J. H. MILLER, Assistant Examiner

U.S. Cl. X.R.

23—191, 204; 106—55; 264—56, 313, 332